July 10, 1945.    K. E. MARPLE    2,380,184
SYNTHETIC RUBBER COMPOSITIONS
Filed Nov. 6, 1942
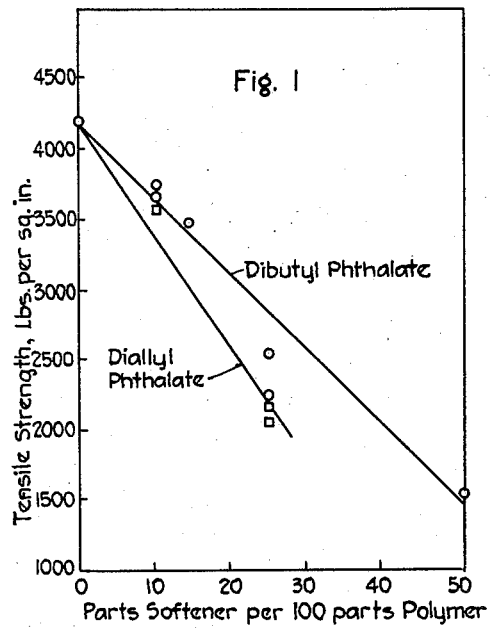
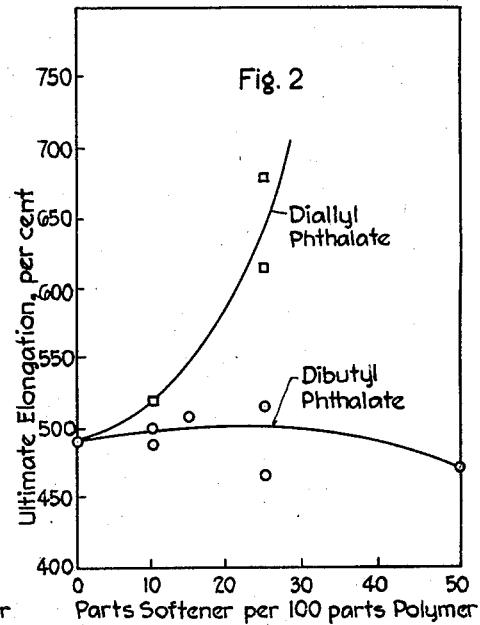
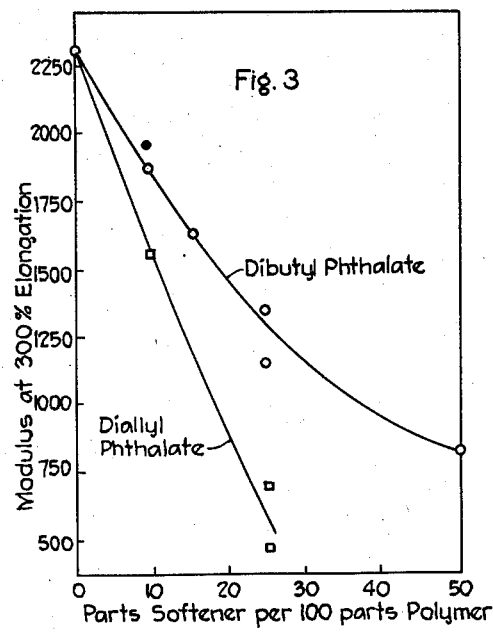
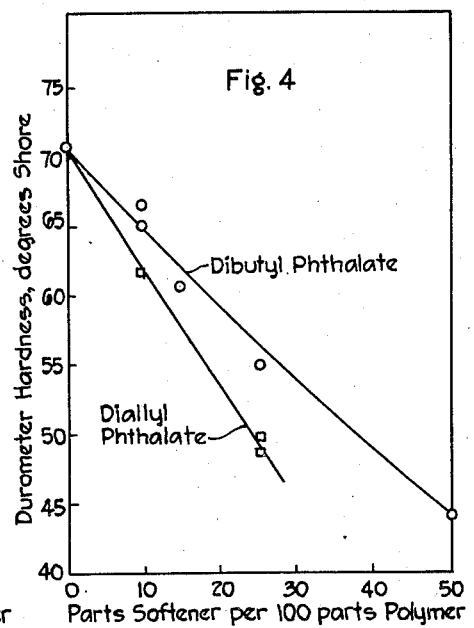
Inventor: Kenneth E. Marple
By his Attorney:

Patented July 10, 1945

2,380,184

UNITED STATES PATENT OFFICE 2,380,184

SYNTHETIC RUBBER COMPOSITIONS

Kenneth E. Marple, Oakland, Calif., assignor to Shell Development Company, San Francisco, Calif., a corporation of Delaware Application November 6, 1942, Serial No. 464,935

8 Claims. (Cl. 260—36)

This invention relates to novel synthetic rubber compositions. More particularly, the invention pertains to improved compositions of butadiene polymerizates or copolymers of butadiene with other polymerizable compounds which compositions contain certain unsaturated alcohol esters of polycarboxylic acids.

As is well known, mastication or milling of crude natural rubber in the presence of oxygen alters its physical properties and mechanical behavior. Such treatment transforms the rubber to a plastic state so that it may be shaped into any form desired. Furthermore, the treatment renders the rubber tacky and capable of readily taking up sulfur as well as organic and inorganic substances used in compounding rubber compositions for vulcanization. This tackiness and plasticity which are obtained by mastication in contact with oxygen are of great value in facilitating the processing of natural rubber.

The property known generally as tackiness is of peculiar importance for compounded rubber and other rubber-like substances. Materials are said to be tacky when they possess the ability for pieces of the material to adhere vigorously together when brought into contact with one another. Many articles of vulcanized rubber and especially those of somewhat complex form, are manufactured by placing a number of separate pieces of compounded rubber into an appropriate mold and subjecting the material to pressure and heat to effect vulcanization. The vulcanization is ordinarily effected by heating the mold with the compounded rubber therein under high pressure. When the compounded rubber has been properly processed and formulated so that it is tacky, the application of pressure in effect fuses the several pieces in the mold into a single coherent mass. Compounded rubber having tackiness of sufficient degree, yields a finished vulcanized rubber article which displays no evidence of having been formed from several pieces of the compounded rubber. If tackiness is lacking in the compounded rubber, satisfactory joining of the several pieces in the mold during processing is not obtained.

Synthetic rubber-like polymers do not respond to the mastication treatment as does natural rubber. While this is true generally, the difference in behavior is especially marked with rubber-like polymerizates which are co-polymers of butadiene and acrylonitrile. These synthetic rubber-like polymers per se lack tackiness and sufficient plasticity for processing to satisfactory vulcanizates.

Among other substances, dibutyl phthalate has been suggested and used as a plasticizer for synthetic rubber by incorporation with the polymers. While the polymers are rendered more plastic by incorporation therein of this substance, compositions with better properties have been desired.

It is an object of the present invention to provide synthetic rubber compositions of improved properties.

Another object is to provide compositions of improved tackiness and plasticity that contain butadiene polymerizates.

A further object is to provide compositions having superior tackiness and plasticity containing copolymers of butadiene and other polymerizable compounds.

I have now discovered that certain unsaturated alcohol esters of polycarboxylic acids are tack-producers and softeners for butadiene polymerizates and copolymers of butadiene with other polymerizable compounds. The compositions of the invention comprising such rubber-like polymers and the unsaturated alcohol esters of polycarboxylic acids possess desirable properties and when compounded yield improved vulcanizates. The tack-producers employed in the compositions are polycarboxylic acid esters of unsaturated alcohols which alcohols contain an olefinic linkage between two carbon atoms, one of which carbon atoms is linked directly to a saturated carbon atom to which in turn is linked the hydroxyl group. It appears that the presence of the unsaturation or olefinic linkage in the compounds is responsible for the improved properties of the compositions.

The preferred compound of the class utilized in the new synthetic rubber compositions is diallyl phthalate. Included within the scope of the invention are esters of such alcohols as methallyl alcohol, crotyl alcohol, methyl vinyl carbinol, cinnamyl alcohol, tiglyl alcohol, 3-hydroxypentene-1, 3-chloro butene-2-ol-1, isopropyl vinyl carbinol, 1-hydroxy-2-methylpentene-2, etc. with aromatic or aliphatic polycarboxylic acids as malonic acid, succinic acid, glutaric acid, adipic acid, tricarballylic acid, maleic acid, fumaric acid, citraconic acid, mesaconic acid, itaconic acid, glutaconic acid, aconitic acid, phthalic acid, terephthalic acid, trimellitic acid, diglycollic acid, and the like as well as suitable substituted compounds thereof as malic acid, tartaric acid, citric acid, etc. The unsaturated esters in the compositions of the invention are neutral esters, i. e. each and all of the carboxylic groups contained in the acids from which they have been derived are esterified.

Furthermore, the preferred esters have a boiling point at 760 mm. pressure of at least 300° C.

The polymer constituents of the compositions are synthetic rubber-like materials such as polymerizates of butadiene or copolymers of butadiene with other polymerizable compounds. By other polymerizable compounds, reference is made to compounds having at least one olefinic linkage therein which enables coupling of the molecules with the butadiene molecules to form the copolymers. The copolymers are interpolymerizates of butadiene with one or more other compounds such as chloroprene (2-chlorobutadiene-1,3), isoprene, isobutylene, styrene, diethyl butadiene, acrylonitrile, methacrylonitrile, acrolein, methacrolein, methyl vinyl ketone, methyl isopropenyl ketone, methyl methacrylate, cyclopentadiene, the methyl pentadienes, dimethyl butadiene, and the like. While the polymerizates may be those obtained with the aid of sodium, boron trifluoride, etc., it is preferred to have the materials of the compositions be prepared by emulsion polymerization.

The proportion of the unsaturated esters may vary considerably in the compositions depending to a large extent upon the particular substances contained therein and the use to which the composition is put. Ordinarily, about 10 to 40 parts of ester per 100 parts of polymer by weight are used, although in special cases a greater or lesser proportion is used.

The unsaturated ester softener is incorporated into the polymer by milling, preferably with a friction roll mill. The incorporation is effected with the mill rolls maintained at lower temperatures than ordinarily employed in milling natural rubber. Temperatures not higher than about 50° C. are to be recommended for the rolls in preparing the compositions.

While the foregoing description has emphasized the ester softener and the rubber-like polymer in the compositions, the presence of various other ingredients is necessary and desirable in the compositions, depending upon the use to which they are put. Thus in preparing a composition for processing or vulcanizing to a finished rubber article, a number of substances are incorporated into the composition. The compositions may contain an anti-oxidant or age-retarder such as an amino compound like phenyl beta naphthylamine or ketone-amine reaction products. An organic vulcanization accelerator is incorporated like benzothiazyl disulfide, tetra methyl thiuram disulfide, mercapto benzothiazol, etc., together with an activator for the accelerator such as zinc oxide. Various powdered materials may be employed as fillers and reinforcers such as channel black, soft blacks, fine size whitings and clays, light calcined magnesia, and fillers which are essentially inert such as barytes and lithopones. In order that vulcanization will occur, the composition will generally contain sulfur or sulfur-liberating compounds. Certain other ingredients are also useful in very minor amounts such as stearic or lauric acid and waxes, both paraffinic and natural. The incorporation of these various substances is effected by milling.

The compositions containing the various ingredients are useful as compounded rubber-like materials which may be vulcanized. The vulcanization of the compounded materials is effected in the usual manner by application of heat and pressure. In this manner a great number of useful articles may be prepared.

For the purpose of illustrating some details of the compositions of the invention, various mixtures were compounded using a copolymer of butadiene and acrylonitrile known commercially as Hycar O. R. with the preferred softener, diallyl phthalate as well as with dibutyl phthalate and with no softener. The compounded mixtures were prepared according to the formula below, the ingredients having been added in the order listed.

| | Parts by weight |
|---|---|
| Rubber-like copolymer (Hycar O. R.) | 100 |
| Phenyl beta-naphthylamine | 1.0 |
| Benzothiazyl disulfide | 1.25 |
| Softener | Varied |
| Zinc oxide | 5.0 |
| Channel black | 50.0 |
| Stearic acid | 0.5 |
| Sulfur | 1.25 |

The compounded mixtures were then vulcanized at 153° C. for 30 minutes. The observations and results of tests are given in the following table. Where several values are given, these are the results with separately compounded samples.

| Softener | None | Diallyl phthalate | | Dibutyl phthalate | | | |
|---|---|---|---|---|---|---|---|
| Parts per 100 parts Hycar O. R. | 0 | 10 | 25 | 10 | 15 | 25 | 50 |
| Rate of incorporation | | Moderate | Moderate | Slow | Slow | Slow | |
| Unvulcanized compound: | | | | | | | |
| (1) Tack | Very poor | Poor | Fair | Poor | Poor | Fair | Good |
| (2) Plasticity No. | 33.7 | 21 | 17 | 21 | 29 | 21.5 | |
| Vulcanizate: | | | | | | | |
| (1) Tensile strength, lb./in.² | 4,308 | 3,648 | 2,320 / 2,140 | 3,772 / 3,840 | 3,530 | 2,316 / 2,585 | 1,525 |
| (2) Ultimate elongation, percent | 494 | 530 | 673 / 628 | 503 / 490 | 514 | 562 / 518 | 471 |
| (3) Modulus at 300 percent elongation | 2,260 | 1,520 | 490 / 720 | 1,810 / 1,880 | 1,620 | 1,320 / 1,160 | 780 |
| (4) Durometer hardness | 71 | 62 | 48 / 50 | 66 / 65 | 62 | 55 | 44 |
| (5) Abrasion, cc./H. P. hr. | 35 | 20.5 | 94 | 49.2 / 47.3 | 16 | 46.5 | |

A better understanding of the tabulated results is to be gained from graphical representation shown in Figures 1, 2, 3 and 4 of the accompanying drawing.

Figure 1 is a plot of values of tensile strength in lbs. per sq. in. on the ordinate axis and parts of softener per 100 parts of polymer (Hycar O. R.) on the abscissa axis for the compositions containing diallyl phthalate or dibutyl phthalate as softener.

Figure 2 is a plot of values of ultimate elongation in per cent on the ordinate axis and parts of softener per 100 parts of polymer (Hycar O. R.) on the abscissa axis for compositions containing diallyl phthalate or dibutyl phthalate as softener.

Figure 3 is a plot of values of modulus at 300% elongation in lbs. per sq. in. on the ordinate axis and parts of softener per 100 parts of polymer (Hycar O. R.) on the abscissa axis for compositions containing diallyl phthalate or dibutyl phthalate as softener.

Figure 4 is a plot of values of durometer hardness in degrees Shore on the ordinate axis and parts of softener per 100 parts of polymer (Hycar O. R.) on the abscissa axis for compositions containing diallyl phthalate or dibutyl phthalate as softener.

The improvement of properties of the compositions containing diallyl phthalate as compared to those containing dibutyl phthalate is evident from the graphical representations of Figures 1 and 2. It is known that addition of softeners tends to decrease the tensile strength of compositions and that the ultimate elongation is increased by their presence. The ideal softener in this respect would cause no decrease in tensile strength while greatly increasing the ultimate elongation. This cannot be realized practically. The figures do show, however, that the decrease in tensile strength with a particular proportion of diallyl phthalate is only slightly less than that with dibutyl phthalate, while the ultimate elongation is markedly superior. This difference is due to the unsaturation or presence of olefinic linkage in the diallyl phthalate.

I claim as my invention:

1. A composition of matter containing a rubber-like polymer from the class consisting of polymerizates of butadiene and copolymers of butadiene and another polymerizable compound containing an olefinic linkage, and as softening agent therefor, a neutral polycarboxylic acid ester of an open chain monohydric unsaturated alcohol which alcohol contains an olefinic linkage between two carbon atoms, one of which carbon atoms is linked directly to a saturated carbon atom to which in turn is linked the hydroxyl group.

2. A composition of matter comprising a vulcanizate of the composition as claimed in claim 1.

3. A composition of matter containing a rubber-like copolymer of butadiene and another polymerizable compound containing an olefinic linkage, and as softening agent therefor, a neutral ester having a boiling point of at least 300° C. at 760 mm. pressure of an aromatic polycarboxylic acid and an open chain monohydric unsaturated alcohol which alcohol contains an olefinic linkage between two carbon atoms, one of which carbon atoms is linked directly to a saturated carbon atom to which in turn is linked the hydroxyl group, said ester being present in an amount of from 10 to 40 parts by weight per 100 parts of said copolymer.

4. A composition of matter containing a copolymer of butadiene with acrylonitrile and diallyl phthalate.

5. A composition of matter comprising a vulcanizate of the composition as claimed in claim 4.

6. A composition of matter containing a copolymer of butadiene with acrylonitrile, and diallyl phthalate in an amount of from 10 to 40 parts by weight of the ester per 100 parts of said copolymer.

7. A composition of matter containing a copolymer of butadiene with styrene, and diallyl phthalate.

8. A composition of matter comprising a vulcanizate of the composition as claimed in claim 7.

KENNETH E. MARPLE.